United States Patent
Guzik et al.

(10) Patent No.: US 11,617,955 B2
(45) Date of Patent: Apr. 4, 2023

(54) INTER REAL-WORLD AND VIRTUAL WORLD SUBJECT MATTER INTERCHANGE

(71) Applicants: Andrew Guzik, Edina, MN (US); Matthew Guzik, Edina, MN (US)

(72) Inventors: Andrew Guzik, Edina, MN (US); Matthew Guzik, Edina, MN (US)

(*) Notice: Subject to any disclaimer, the term of this patent is extended or adjusted under 35 U.S.C. 154(b) by 0 days.

(21) Appl. No.: 17/359,695

(22) Filed: Jun. 28, 2021

(65) Prior Publication Data
US 2022/0410011 A1 Dec. 29, 2022

(51) Int. Cl.
*A63F 13/65* (2014.01)
*A63F 13/5378* (2014.01)
*A63F 13/216* (2014.01)
*A63F 13/35* (2014.01)

(52) U.S. Cl.
CPC ............ *A63F 13/65* (2014.09); *A63F 13/216* (2014.09); *A63F 13/35* (2014.09); *A63F 13/5378* (2014.09)

(58) Field of Classification Search
CPC ........ A63F 13/65; A63F 13/216; A63F 13/35; A63F 13/5378
See application file for complete search history.

(56) References Cited

U.S. PATENT DOCUMENTS

| 2002/0090985 A1* | 7/2002 | Tochner | A63F 13/655 463/9 |
| 2013/0116044 A1* | 5/2013 | Schwartz | A63F 13/73 463/29 |
| 2018/0350144 A1 | 12/2018 | Rathod | |
| 2020/0160589 A1* | 5/2020 | Eronen | G06F 3/013 |

OTHER PUBLICATIONS

Barr, "Superquadrics and Angle-Preserving Transformations," in IEEE Computer Graphics and Applications, vol. 1, No. 1, pp. 11-23, Jan. 1981, doi: 10.1109/MCG.1981.

* cited by examiner

*Primary Examiner* — Kevin Y Kim
(74) *Attorney, Agent, or Firm* — Han Santos, PLLC

(57) ABSTRACT

Techniques for implementing inter real-world and virtual world subject matter interchange are described. Particularly, the techniques leverage an extension of a game application to access one or more objects in the real-world that are mapped as at least one virtual element on the virtual world. The objects in the real-world may include a business or an entity that can be represented by at least one virtual element in the virtual world. In one example, an installation of the extension may allow the objects in the real-world to be mapped as virtual elements on the virtual world. Based upon a player's interaction with the one or more virtual elements, an event handler is triggered to expose at least one application program interface (API) of the corresponding mapped objects. A subsequent execution of the event handler may implement the inter real-world and virtual world subject matter interchange.

20 Claims, 8 Drawing Sheets

INTER REAL-WORLD AND VIRTUAL WORLD SUBJECT MATTER INTERCHANGE

BACKGROUND

Internet or network-based games are experiencing increasing popularity. Current network-based games may provide a shared environment for multiple players to interact in a virtual world. With ubiquitous connectivity to the Internet, players all over the world can interact via the virtual environment and perform various game objectives such as sharing resources, competition, shared problem-solving, and/or the like. Furthermore, because of the popularity of such games, users are developing user experience patterns in the virtual worlds, i.e., gestures and control actions to interact with the virtual world. However, such gaming systems typically do not have virtual world geography that parallels the real-world. Some location-based games add virtual locations on a map that parallel real-world geography, however, these location-based games do not use the virtual world user experience to create interactions in the real-world.

A parallel reality game providing a shared virtual world that parallels at least a portion of the real-world may attract interactions between multiple players. The parallel reality game may include game features that encourage players to interact with other players in the virtual world and via different game objectives while creating interactions with the real-world.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Figure 1:
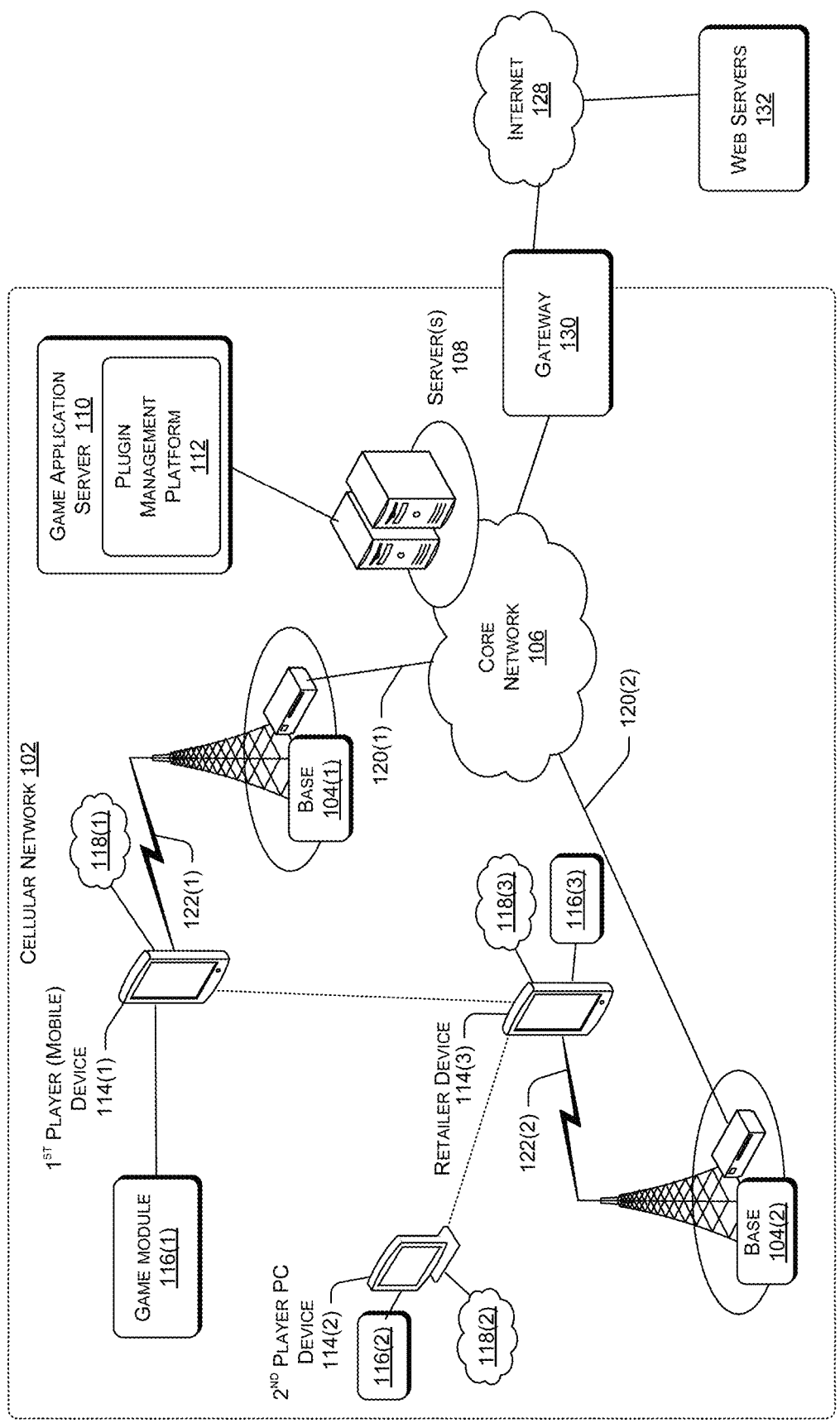
FIG. 1 is an example diagram of a communication network environment in which an inter real-world and virtual world subject matter interchange may be implemented.

This disclosure is directed to techniques for implementing inter real-world and virtual world subject matter interchange. Particularly, the techniques leverage an extension of a game application to access objects in the real-world that are mapped as virtual elements on the virtual world of the game application. The techniques further leverage users' abilities to interact with the virtual elements and translate these interactions to desired actions in the real-world. As described herein, the extension of the game application (e.g., plugin) may add one or more features to the game application.

The objects in the real-world may include businesses or entities that can be represented by one or more virtual elements in the virtual world. The virtual world in the extension may include a relative position preserving transformation representation i.e., isomorphic of a subset map of the real-world. In this way, a user may make use of knowledge of the position of the business or entity in the real world to find the virtual analogue's position in the virtual world. The initial portion of subject matter interchange may include the mapping and representing of each of the objects as a virtual element on the isomorphic virtual world. The subsequent portion of subject matter interchange may then include the manipulation of the virtual element to perform a data exchange—via an application program interface (API)— and obtain a corresponding interaction with the object in the real-world. In this way, the user is making use of knowledge of the video game's user experience interaction model to manipulate the virtual element to perform a corresponding interaction with the real-world.

In one example, a client device may host a virtual open-world video game where players can build, craft, and enchant things using craft tools such as a shovel, ax, bowl, etc. In this example, the installation of the extension may allow the objects in the real-world to be mapped as virtual elements on the virtual open-world of the video game. Based upon a player's interaction with the virtual element, an event handler is triggered to invoke one or more APIs of the corresponding mapped object(s). A subsequent execution of the event handler may implement the inter real-world and virtual world subject matter interchange via manipulation by the player of the mapped objects in the real-world through the representative virtual element in the virtual world. As described herein, the event handler may include a program that is associated with a pre-configured player interaction in the virtual world. The player is the main character in the game application.

In one example, a network server may receive a request to install or activate the extension in the game application. The network server may host the extension while the game application can be installed on a user device (or client device). In response to the received request, the network server may allow the installation or activation of the extension and further transmit game data that allows the player to virtually navigate the objects in the real-world that are mapped as virtual elements at corresponding locations on the geography of the (isomorphic) virtual world. The transmitted game data may also include at least one virtual item to enable the player to interact with the virtual elements. In one example, a player interaction with the virtual element via the virtual item may trigger an event-handler comprised of one or more invocations of an exposed API or APIs. The one or more invocations, for example, may include collecting payments from an account of the player, forwarding one or more purchase order of goods or services to a corresponding object in the real-world, tracking the delivery of the purchased goods or services, sending notifications to a requesting user device, and/or the like.

The geography of the virtual world in the game application may include an analogue representation of the subset map of the real-world. The analogue representation may be a transformed caricature representation that can include a partial to substantial faithful rendition of the subset map of the real-world. For example, the subset map may be taken from an open-source such as Environmental Systems Research Institute (ESRI) open data, Maptitude™, Global Mapper™, and/or the like. In this example, a transformation algorithm may be utilized to generate a relative position-preserving transformation representation of the subset map of the real-world. Specifically, the relative position-preserving transformation is constrained from changing actual perceivable connections between mapped objects in the real-world, but the angles and/or distances of the objects may change and are not necessarily preserved. In one embodiment, the mapping of the real-world to the virtual world is a mathematical isomorphisms. In this embodiment, the real-world is isomorphic to the virtual world after an application of a bijective property preserving function. In this way, a user may make use of knowledge of the real-world to be able to navigate in the virtual world.

In one example, the transformation algorithm or the property-preserving function may include a dilation transformation algorithm that uses a scaling factor to change the sizes of the objects and/or the area within the subset map to be transformed. For example, a high scaling factor (>1) may be applied to point coordinates of the object to emphasize or enlarge the size of the object. In this example, the dilation transformation algorithm may change the size of the object while preserving the object's position relative to another object. However, the angle and/or distance transformation on this object is not preserved i.e., different from an original angle and/or distance measurement.

The novel techniques referenced above are presented herein and described in detail, below, with respect to several figures that identify elements and operations used in systems, devices, methods, and computer-readable storage media that implement the techniques.

Example Network Environment

FIG. 1 is a diagram of an example communication network environment 100 in which an inter real-world and virtual world subject matter interchange may be implemented via an installation of the extension in the game application. The subject matter interchange may include mapping of the objects in the real-world as virtual elements on the parallel virtual world of the game application. The subject matter exchange may also include configuring the virtual elements to correspond to web-only services. For example, objects such as a business or entity may be represented as a particular virtual element on the parallel virtual world of the game application. In another example, a particular virtual element on the virtual world of the game application can be configured to represent web-only services such as an Ebay™ online store in the parallel real-world. In these examples, player interaction with the virtual element in the game application may be trapped by the extension as event data. The trapped event data may then trigger an event handler that can invoke one or more APIs of the corresponding object. The event handler may facilitate manipulation of the corresponding object via the invocations of one or more APIs. For example, the event handler comprises one or more invocations of the exposed API. In this example, the invocations of the exposed API may facilitate collection of payments from an account of the player, delivery of purchased goods or services, sending of notifications such as completions of the delivery by the business or entity, and/or the like. An execution of the event handler may facilitate the inter real-world and virtual world subject matter exchange as described herein.

As shown, the communication network environment 100 may include a cellular network 102 that is provided by a wireless telecommunication carrier. It is noted that, although the present discussion refers to a cellular network, other network architectures may be used in place of the cellular network shown and described with respect to FIG. 1. The cellular network 102 may include, for example, cellular network base stations 104(1)-104(2) and a core network 106. The core network 106 may further include one or more servers 108 such as a game application server 110 that includes a plugin management platform 112. The plugin management platform 112 may manage, for example, the extensions to be installed on user devices 114(1)-114(3). For example, the user devices 114(1)-114(3) may include game modules 116(1)-116(3), respectively, that can store the game applications. In this example, the plugin management platform 112 may manage the activation of the extensions in each of the game modules 116(1)-116(3) to enable players (not shown) to access and manipulate the objects in the real-world via corresponding virtual elements on the parallel virtual world of the game applications. The game application, for example, may include building, crafting, and/or enchanting things using craft tools.

Each of the user devices 114(1)-114(3) may be capable of connecting to a network, including the Internet, via a wireless network connection other than, or in combination with, the carrier network wireless services. As shown, the user device 114(1) may include a connection to a network 118(1), user device 114(2) includes a connection to a network 118(2), and the user device 114(3) includes a connection to a network 118(3). The user device 114(2) may include a personal computer (PC) that can be typically used by gamers at a stationary location e.g., home or school. The wireless connections are made by way of any method known in the art, such as Bluetooth®, Wi-Fi™, Mesh, and/or wired connections. Further, the user devices 114(1)-114(3) may be communicatively connected with each other via cellular data, use of Internet Packet (IP), or a combination thereof.

Each one of the base stations 104(1)-104(2) may serve as a hub of the local wireless network and/or a gateway between a wired network and a wireless network. The base stations 104(1)-104(2) may be responsible for handling data traffic between the user devices 114(1)-114(3) that can be associated with different parties such as a first user or player for the user device 114(1), a second user or player for the user device 114(2), and a retailer store for the user device 114(3), for instance, and without limitation. In one example, the user device 114(3) may be associated with one or more objects in the real-world that are mapped as virtual elements on the parallel virtual world of a game application with installed extension. Multiple other user devices (not shown) may be associated with other objects in the real-world. In this example, the users associated with the user devices 114(1)-114(2) may utilize their respective player avatars or main characters in the game application to purchase goods from the mapped retailer store that can be associated with the user device 114(3) in the real-world.

Further, in some embodiments, the base stations 104(1)-104(2) are responsible for establishing wireless communications between the user devices 114(1)-114(3) and the plugin management platform 112. Each of the base stations 104(1)-104(2) may be communicatively connected to the core network 106 via a corresponding backhaul 120(1)-120(2). Each of the backhauls 120(1)-120(2) may be implemented using copper cables, fiber optic cables, microwave radio transceivers, and/or the like. Accordingly, each one of the user devices 114(1)-114(3) may connect to the plugin management platform 112 via cellular signals 122 of the base station 104 and the core network 106. The core network 106 may provide telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), 5G and/or so forth.

Each of the user devices 114(1)-114(3) may include an electronic communication device such as a cellular phone, a smartphone, a session initiation protocol (SIP) phone, a laptop, a PDA, a satellite radio, a global positioning system (GPS), IoT devices with a tracking mechanism, a multimedia device, a video device, a camera, a game console, a tablet, a smart device, a wearable device, or any other similar functioning device. Further, each of the user devices 114(1)-114(3) may be capable of connecting to an Internet 128 via a gateway 130. Additionally, apart from the cellular network 102, the communication network environment 100 may include multiple web servers 132 that may be accessed through the Internet 128.

In an example embodiment, the plugin management platform 112 may be configured to manage the installation of the extension in each of the user devices 114(1)-114(3). For example, the game application server 110 may receive a request from the user device 114(1) to activate a plugin. The plugin may include an add-on program that implements the inter real-world and virtual world subject matter interchange by mapping and accessing the objects in the real-world via the virtual elements on the parallel virtual world. In response to the request, the plugin management platform 112 may verify the identity of the requesting user device and activate the plugin in the user device 114(1) to allow the mapped objects in the real-world to be accessed and manipulated via the corresponding virtual elements.

Following the identification verification and activation of the plugin in the user device 114(1), the plugin management platform 112 may send game data that may outline operations and/or configurations of the activated extension and/or the game application. The game data may include pre-configured events data that can be generated by trapped player's interactions with the virtual elements, event handler configurations including triggering by the events data, execution of the event handlers, invoking of the APIs of the mapped objects, and/or the like. In one example, the game data may include a virtual item to enable the player in the game application to interact with the one or more virtual elements that represent the objects in the real world. The virtual item may include a tool that can be used by the player, for example, to press a button or block in the virtual element to purchase goods in the corresponding retailer store in the real-world, rotate clockwise to emphasize the virtual element, rotate counter-clockwise to deemphasize the virtual element, and/or the like. In this example, the player's interactions may correspond to the pre-configured events data that can trigger the events handlers as described herein.

In one example, the installed plugin may trap the events data that are generated by the player's interactions with the virtual elements. The trapped events data may trigger the event handler comprised of one or more invocations of an exposed API or APIs of the mapped object. For example, the player interaction of pressing the virtual item against a menu button in a particular virtual element may correspond to ordering of food from the retailer—user device 114(3) in the real-world. In this example, the plugin traps the pressing of the virtual item against the button as an event data that can trigger the event handler to send the food order request via the exposed API of the corresponding object. The plugin management platform 112 may send the food order request by executing the event handler. Following the execution of the event handler, the game application may go back to its default operation where the player can perform another interaction with the one or more virtual elements.

The game module 140 may store one or more game applications in the user device 114. In one example, the game module 140(1) of the user device 114(1) may run a Minecraft™ game application that includes building and crafting things using crafting tools. In this example, the user device 114(1) may request activation of the extension to access the APIs of the objects that are mapped as virtual elements on the virtual world of the Minecraft™ game application. Other types of game applications such as Roblox™ may similarly use the extension as described herein.

Example Mapping of a Subset of a Real-World to a Virtual World

Figure 2:
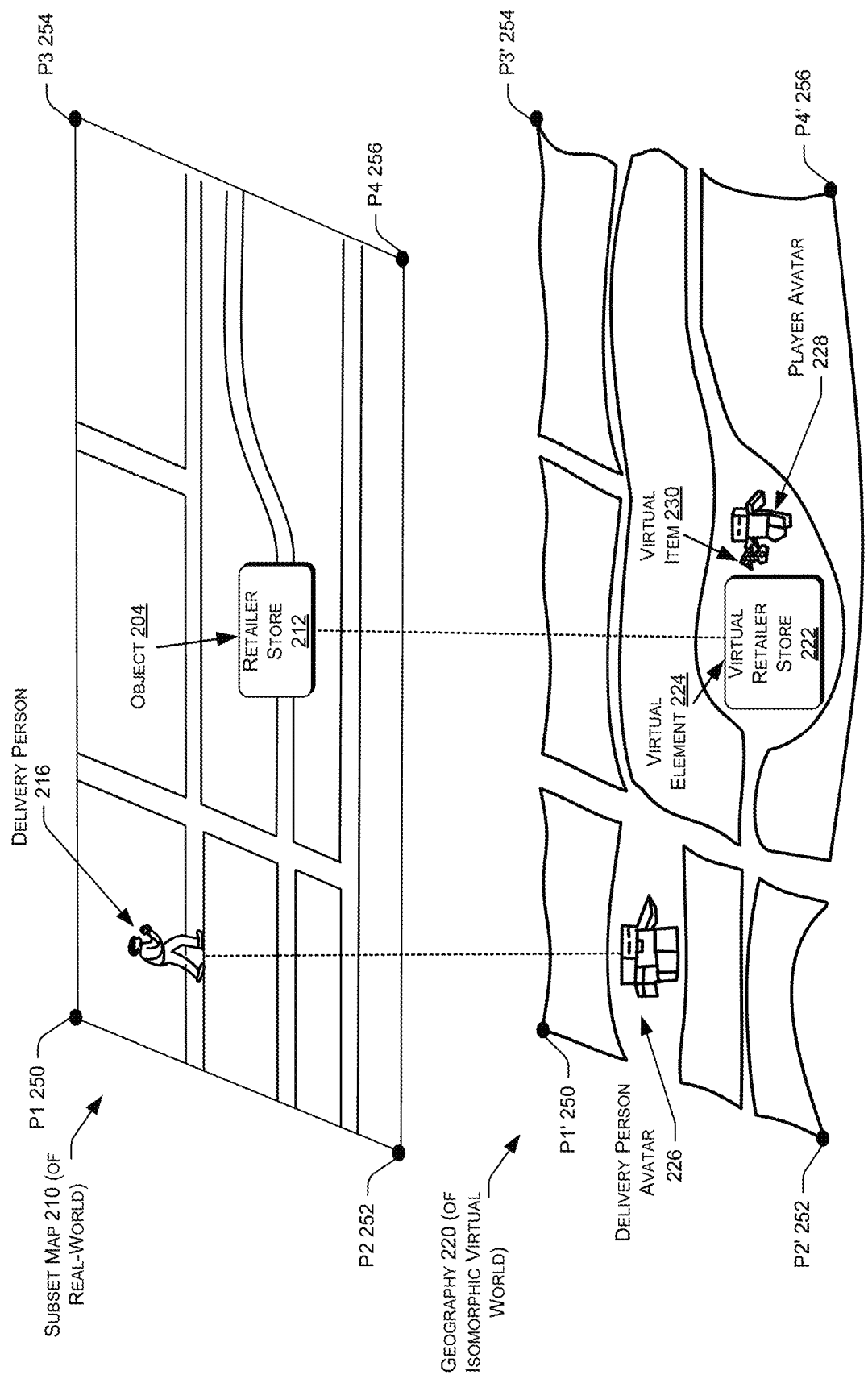
FIG. 2 is an example transformation and mapping of a subset map of the real-world to an isomorphic virtual world following activation of an extension in a game application.

FIG. 2 is an example transformation and mapping diagram 200 that illustrates the transformation and mapping of a subset map of the real-world to virtual geography on the isomorphic virtual world upon activation of the extension in the game application. The example transformation and mapping diagram 200 shows a subset map 210 of the real-world including a retailer store 212, which can also be referred to as an object 204 in the subset map, and a delivery person 216. Correspondingly, the transformation and mapping diagram 200 includes a geography 220 of the parallel virtual world including a virtual retailer store 222, which can also be referred to as a virtual element 224, and a delivery person avatar 226. The geography 220 further shows a player avatar 228 who is holding a virtual item 230. The object—retailer store 212 in the subset map 210 is mapped as the virtual element—retailer store 222 on the geography 220. In one example, a bijective property preserving function may be applied on the subset map 210 to make the subset map 210 isomorphic to the geography 220. In this example, the bijective property-preserving function may preserve actual perceivable connections between the objects or points.

The player avatar 228 may include a character in the game application that can be controlled to build and craft things such as the virtual element 224. In one example, the game data preconfigures the virtual element 224 to appear at a mapped location on the geography 220. For example, the virtual element 224 is mapped to location "xyz" on the geography 220. Alternatively, the player avatar 228 builds the virtual element 224 using the virtual item 230, and the game data provides the location "xyz" as the address of the built virtual element 224.

The virtual element 224 may be configured to represent the object 204 from the subset map 210. Based upon interactions of the player avatar 228 with the virtual element 224, different events handlers can be triggered to access the object 204. For example, the pointing of the virtual item 230 by the player avatar 228 towards the virtual retailer store 222 may open the main door of the virtual retailer store. In another example, waving the virtual item 230 may open the menu for ordering goods or services. In some game applications where a user-controlled player avatar can enter audio-to-text translations, input characters via a keyboard or GUI, fill out text boxes, select menus in a pop-up screen, make a gesture to move around, or move objects to denote an action, the corresponding event handler may be triggered to perform the desired actions in the parallel subset map 210. In these examples, the object 204 may be accessed and manipulated via the player's interactions with the virtual element 224 and invoked one or more APIs of the object 204.

The delivery person avatar 226 may include a representative—virtual character of the real-world delivery person 216. In one example, the player avatar 228 uses the virtual item 230 to order a particular product from the virtual retailer store 222. This player interaction triggers the event handler that sends the requested order to the retailer store 212 when executed. During the delivery of the purchased particular product, the network server may track the current location of the delivery person 216 e.g., via Global Positioning System (GPS) tracking, and update the hosting user device of the current location of the delivery person. The game application may then adjust the current location of the delivery person avatar 226 based upon the received location of the real-world delivery person 216.

The subset map 210 may include a portion or area of the real-world map that can be downloaded from an open source such as the ESRI™ data map. The subset map 210 may be bounded by a certain distance threshold from a requested location or the current location of the player avatar 228. For example, the player avatar 228 is currently located in front of the virtual retailer store 222 at address "xyz." In this example, the subset map 210 may be configured to include the portion of the real-world map having an area that is within a 1000-meter radius (a distance threshold value) from the current location of the player avatar 228. In another example, the location of the virtual retailer store 222 may be searched via a user-entered particular address in the keyboard of the PC or user device. In this other example, the subset map 210 may include the portion of the real-world map having an area that is within a distance threshold value from the user-entered particular address. The distance threshold value may limit the area of the geography 220 that can be displayed on a user interface of the user device.

The geography 220 may include an equivalent caricature transformation of the subset map 210 of the real world. The equivalent caricature transformation may be derived by applying a transformation algorithm such as the bijective property-preserving function to the subset map 210 to generate a relative position-preserving transformation that includes a manipulation of the actual subset map 210 to distort the distances and/or angles of the objects but preserves the actual perceivable connections between the objects. Since the subset map 210 is isomorphic to the geography 220, the user may be able to leverage user's knowledge of the objects in the real world to navigate in the virtual world. In one example, the transformation algorithm may include a dilation transformation algorithm that uses a dynamic scaling factor "$D_k$" to emphasize or deemphasize the subset map 210. The dynamic scaling factor may change the angle and/or distance transformations of the pre-image of the subset map 210 but preserves their respective positions.

For example, the dilation transformation algorithm may apply a scaling factor "$D_k$" of less than 1 (k<1) to point coordinates P1 250, P2 252, P3 254, and P4 256 of the pre-image subset map 210. In this example, the transformation may generate transformed point coordinates P1' 250, P2' 252, P3' 254, and P4' 256 at the image—geography 220. In this example still, the transformation may shear the other point coordinates in the subset map 210 to change the distance and/or angles of the pre-image but the actual perceivable connections between the objects may remain the same. For example, the actual perceivable connection between the delivery person avatar 226 and the virtual element 224 may remain the same. In another example, the actual perceivable distance between P1 250 to P2 252 may remain the same as that of the P1' 250 to P2' 252. In these examples, the actual perceivable distances may remain the same because the subset map 210 of the real-world may be treated as isomorphic to the geography 220 of the virtual world.

Alternatively, the dilation transformation algorithm may be used to automatically emphasize the object or area that is within a shorter distance threshold value from the current location of the player avatar 228. For example, the player avatar 228 is walking towards the virtual retailer store 222. In this example, the plugin management platform 112 may increase the scaling factor on the point coordinates of the objects or areas that are within 10 meters of the player avatar 228 to emphasize the immediate surroundings of the player avatar 228. This distance threshold value is different and shorter than the distance threshold value as described in the subset map 210 above. In the subset map 210, the distance threshold value from the current location of the player avatar 228 is used to identify the area to be downloaded from the open-source. In this alternative embodiment, the shorter distance threshold value is used to emphasize or deemphasize the immediate object or area around the player avatar 228 so that the player avatar 228 can conveniently interact with the representative virtual element.

In various embodiments, the player avatar 228 may be controlled to pick up and use the virtual item 230 upon entering the virtual retailer store 222. The player avatar 228 may enter the virtual retailer store 222 and perform a configured gesture such as aligning and pressing the virtual item 230 against a block in a selection of blocks (not shown) in the virtual retailer store 222. The selection of blocks, for example, may correspond to different orders of goods from the retailer store 212. Following the pressing of the virtual item 230 against a particular block, a corresponding event data is trapped by the extension in the game application, and the trapped event data triggers the event handler that includes a preconfigured routine for one or more invocations of the at least one exposed API of the object 204. For example, the invocation may include sending the particular order to the retailer store 212. In another example, the invocation may include a collection of payment from the account of the player avatar 228, tracking of delivery of the order, and/or the like. In these examples, the plugin management platform 112 of the game application server 110 in FIG. 1 may manage the execution of the event handlers to implement the inter real-world and virtual world subject matter interchange as described herein.

Example Network Server Environment

Figure 3:
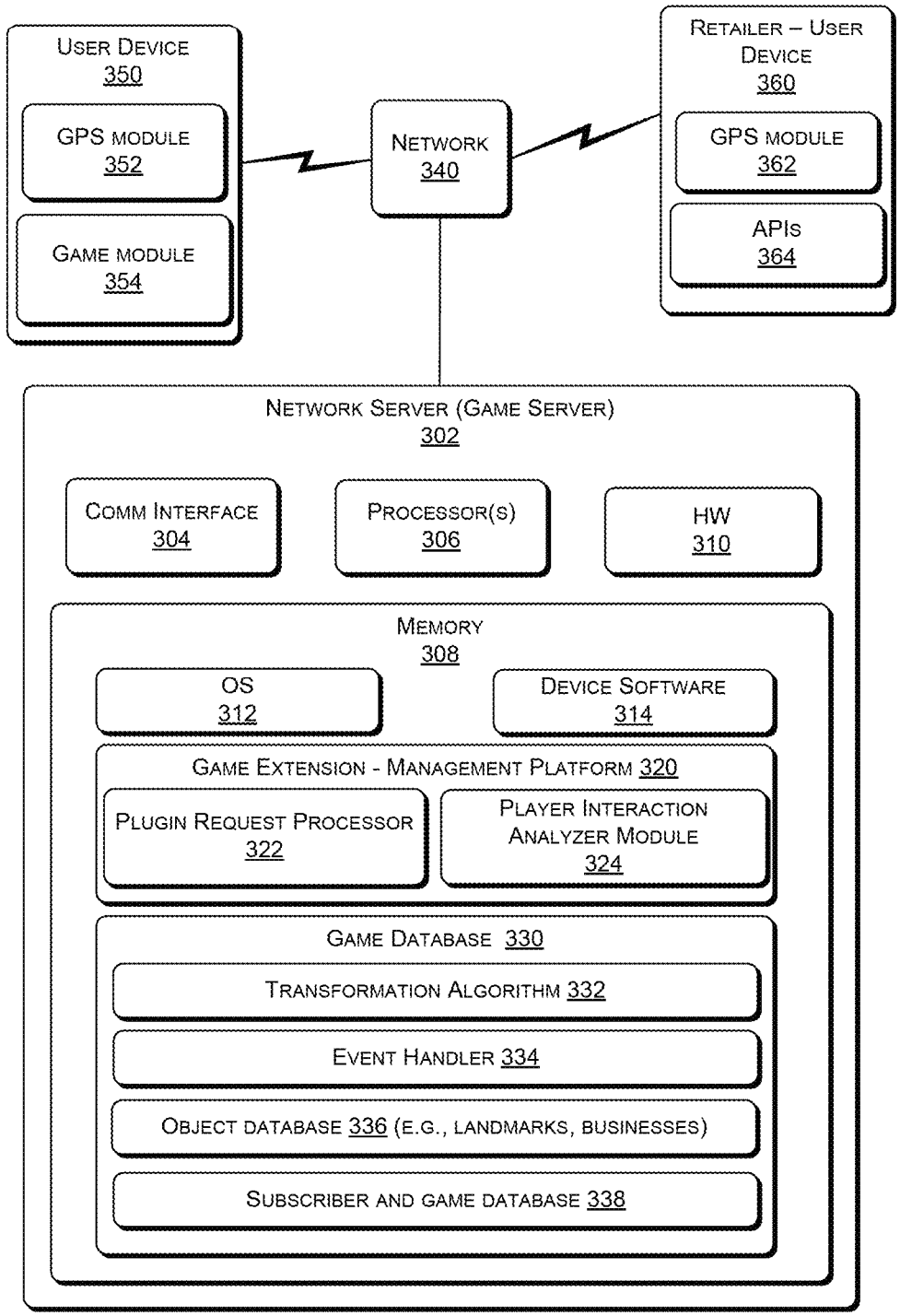
FIG. 3 is an example block diagram of a network server that facilitates the inter real-world and virtual world subject matter interchange via the extension in the game application.

FIG. 3 is a block diagram of an example network server environment 300 that facilitates the inter real-world and virtual world subject matter interchange via the extension in the game application. The network server environment 300 includes a network server 302 that corresponds to the game application server 110 of FIG. 1. The network server 302 may be communicatively connected, via a network 340, to user devices 350 and 360 that are associated with a user-purchaser and a retailer store, respectively. The user devices 350 and 360 may correspond to the user device 114(1) and the retailer store—user device 114(3) of FIG. 1, respectively.

The network server 300 may include a communication interface 304, one or more processors 306, memory 308, and device hardware 310. The communication interface 304 may include wireless and/or wired communication components that enable the network server 300 to transmit or receive voice and/or data communication via the wireless carrier network, as well as other telecommunication and/or data communication networks. In one example, the communication interface 304 may facilitate sending of the activation signal, game data, and/or other information that relates to an installation of the extension of the game application in the user device 350. In this example, the user device 350 may install the extension to implement inter real-world and virtual world subject matter interchange as described herein.

The memory 308 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 310 may include a modem that enables the network server 300 to perform data communication with the wireless carrier network. The device hardware 310 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the network server 300 to execute applications and provide data communication functions.

The one or more processors 306 and the memory 308 may implement an operating system 312, device software 314, and a game extension—management platform 320 that corresponds to the plugin management platform 112 of FIG. 1. Such software may include routines, program instructions, objects, and/or data structures that are executed by the processors 306 to perform particular tasks or implement particular abstract data types. The one or more processors 306 in conjunction with the game extension—management platform 320 may further operate and utilize a plugin request processor 322, a player interaction analyzer module 324, and a game database 330 including a transformation algorithm 332, event handler 334, object database 336, and subscriber and game database 338.

The operating system 312 may include components that enable the network server to receive and transmit data via various interfaces (e.g., user controls, communication interface 304, and/or memory input/output devices). The operating system 312 may also process data using the one or more processors 306 to generate outputs based on inputs that are received via a user interface. For example, the operating system 312 may provide an execution environment for the execution of the game extension—management platform 320. The operating system 312 may include a presentation component that presents the output (e.g., displays the data on an electronic display, stores the data in memory, transmits the data to another electronic device, etc.).

The operating system 312 may include an interface layer that enables the game extension—management platform 320 to interface with the modem and/or the communication interface 304. The interface layer may comprise public APIs, private APIs, or a combination of both public APIs and private APIs. Additionally, the operating system 312 may include other components that perform various other functions generally associated with an operating system. The device software 314 may include software components that enable the network server to perform functions. For example, the device software 314 may include a basic input/output system (BIOS), bootrom, or a bootloader that boots up the network server 300 and executes the operating system 312 following power-up of the network device.

The game extension—management platform 320, when executed, manages the activation and configurations of the extensions in the user devices to enable the players such as the player avatar 228 of FIG. 2 to access and manipulate the objects in the real-world via the corresponding virtual elements on the parallel and isomorphic virtual world. Manipulation of the objects may include entering into transactions with the objects via the player interactions with the representative virtual elements. The game extension-management platform 320 may be a single block of executable instructions or it may be made up of several components. The components included in at least one implementation are described below. However, it is noted that in other implementations, more or fewer components may be configured and that one or more operations attributed to a particular component in the following description may be implemented in one or more other components.

The plugin request processor 322 may process the request from one or more user devices (e.g., user device 350) to install or activate the extension. One functionality of the plugin request processor 322 is to verify the device identification of the requesting one or more user devices that may be used to transact with the objects in the real-world via the virtual elements in the installed extension. During an initial sign-up to subscribe to the game application—extension, a subscriber may enter the subscriber's name and user profiles, device identification, and/or other information such as types and modes of payments preferred by the subscriber (e.g., Zelle™, PayPal™) when paying for purchased goods or services via the extension. In this regard, the plugin request processor 322 may search for matching device identification in the subscriber and game database 338 to verify the requesting user device. Upon verification of the requesting user device, the plugin request processor 322 may send verification information to the player interaction analyzer module 324.

The player interaction analyzer module 324 may be configured to manage the inter real-world and virtual world subject matter interchange via the installed extension in the game application of the user device 350. One functionality of the player interaction analyzer module 324 is to identify a subset map of the real-world to be downloaded from an open source such as the ESRI™ open data. In one example, the player interaction analyzer module 324 may use current geolocation coordinates of the player avatar 228 of FIG. 2 on the geography of the isomorphic virtual world to find the subset map that will be downloaded from the ESRI™ open data. Note that the geolocation coordinates of the player avatar 228 may not necessarily be the location of the user who may be using a PC at a stationary place. The subset map may be bounded by a specific distance threshold to filter the objects and/or areas to be transformed and displayed on the user device 350. For example, the distance threshold includes a value of 1000 meters from the current geolocation coordinates of the player avatar. In other cases, the player interaction analyzer module 324 may detect construction or building of the virtual element (structure) by the player avatar using the craft tools in the game application. In this regard, the player interaction analyzer module 324 may use the object database 336 to search for the matching landmark, business, and/or the like, and use the address of the matching landmark or business for the distance threshold above. In some other cases, the player interaction analyzer module 324 may use a user-entered location to identify the subset of the real-world to be downloaded, transformed, and displayed on the user interface of the user device 350.

Following the identification and downloading of the subset map of the real world, the player interaction analyzer module 324 may use the algorithms stored in the transformation algorithm 332 to generate an equivalent caricature transformation of the downloaded subset map of the real-world. In one example, the algorithm may use a dilation transformation algorithm to distort the distances and/or angles of the objects within the downloaded subset map while preserving position transformations of the objects. In this example, the dilation transformation algorithm may utilize dynamic scaling factors that are applied to point coordinates of the objects to emphasize or deemphasize the objects but not the objects' shapes. In a particular embodiment, the dilation transformation algorithm may preserve connections or routes between pairs of objects in the subset map while the angles and/or distances of the objects are distorted to enlarge or compress their sizes. Other types of transformation algorithms or bijective property preserving functions may be similarly applied to transform the downloaded subset map into geography of the parallel virtual world.

Another functionality of the player interaction analyzer module 324 may include transmitting of the game data of the extension. The game data may include the operations and/or configurations of the activated extension. Further, the game data may include the configurations of the game application that activated the extension. For example, the game data may include the virtual item that enables the player avatar to interact with the one or more virtual elements. In this example, the game data may also include positions, orientations, movements, and/or configurations of the virtual item (relative to the virtual element) to generate the events data that are trapped to trigger the event handler 334. For example, when the virtual item is used to press a button or block within the virtual element, the pressing of the button generates pre-configured event data that trigger the event handler 334 to invoke the APIs of the object that corresponds to the virtual element. In another example, the waving of the virtual item in front of the virtual element may trigger the event handler 334 to request the displaying of a virtual food menu. In this other example, the waving of the virtual item is an event data that can trigger the event handler 334 to invoke the particular API for the food menu.

In some instances where mechanics of the game application may include entering of audio-to-text translations by a user who controls the player avatar, input characters via a keyboard or GUI, or information on text boxes, each of these game mechanics may similarly facilitate the triggering of the event handler 334. For example, the player avatar may enter an order on the virtual element using a virtual keyboard to fill out text boxes. In another example, the player avatar may confirm the user-entered audio-to-text translations. In these examples, the entered information may trigger the event handler 334 to invoke the API of the corresponding object to perform the corresponding desired action.

Alternatively, or additionally, the mechanics of the game application may include finding a diamond, moving objects from one place to another, diving from the sky, and/or similar actions that can be performed by the player avatar. In this regard, each of these game application mechanics may be pre-configured by the game-extension—management platform 320 to correspond to event data that can be used to manipulate the objects in the real-world via the player's interactions with the virtual elements.

The game database 330 may be used by the processors 306 and the player interaction analyzer module 324 to access the objects in the real-world via the virtual elements on the geography of the isomorphic virtual world. In one example, the event handler 334 may include configured responses or routine corresponding to each of the event data that can be trapped by the extension. The event handler 334 may comprise one or more invocations of the APIs of the objects to implement the inter real-world and virtual world subject matter interchange as described herein.

For example, the player interaction analyzer module 324 detects the player avatar to have pressed a button in a selection of buttons in the virtual element to order a box of pizza. In this example, the detected action may trigger the event handler 334 to send a request to the corresponding object (e.g., Pizza Hut') to deliver the box of pizza to a user-entered location. Further, the detected action may trigger the event handler 334 to collect payments from the account of the player avatar. In addition, the execution of the event handler 334 may also track the current locations of the delivery person. For example, the delivery person is mapped to a delivery person avatar in the geography of the virtual world. In this example, the event handler 334 may use the Global Positioning System (GPS) location of the delivery person to track its current location and to update the current position of the delivery person avatar on the geography of the virtual world.

The object database 336 may store the actual locations of the businesses, entities, landmarks, etc. that can be mapped as at least one virtual element on the geography of the virtual world. For example, the object database 336 may store a Pizza Hut' location that has been mapped on the isomorphic virtual world of the game application extension. In another example, the object database 336 may store the web address of web-only services that are mapped as virtual elements on the geography of the virtual world. In this other example, the player interaction analyzer module 324 may use the web address of the web-only services to request for delivery of goods or services, and/or the like.

The subscriber and game database 338 may store the user profiles, game data for the extension, and/or other information that relates to accessing the objects in the real-world via the virtual elements in the parallel and isomorphic virtual world. In one example, the player interaction analyzer module 324 may retrieve and use the user profiles in the subscriber and game database 338 to count the number of purchasing activities performed by the player avatar within a time period, number of game hours, amounts of purchases, and/or the like. In this example, the player interaction analyzer module 324 may reward the account of the player avatar with a coupon when the counted number of purchasing activities exceeds a threshold value. The coupon or rewards may allow the player avatar to make free purchases from the virtual elements.

In one example, the user device 350 is associated with a purchaser of goods and includes components such as a GPS module 352 and a game module 354 that corresponds to the game module 116(1) of FIG. 1. The GPS module 352 may be used to track the current location of the user device 350. In some examples, the current location of the user device 350 is the delivery point for purchased goods from the store retailer—user device 360.

The store retailer—user device 360 may represent a user device or server of the object that is mapped as a virtual element on the geography of the isomorphic virtual world. In one example, the user device 360 may include a GPS module 362 and APIs 364. In this example, the GPS module 362 may be used to track the current location of the user device 360, which may be accessed via the APIs 364. The APIs 364 may be invoked when the event handler is triggered by the trapped event data as described above.

Example User Device

Figure 4:
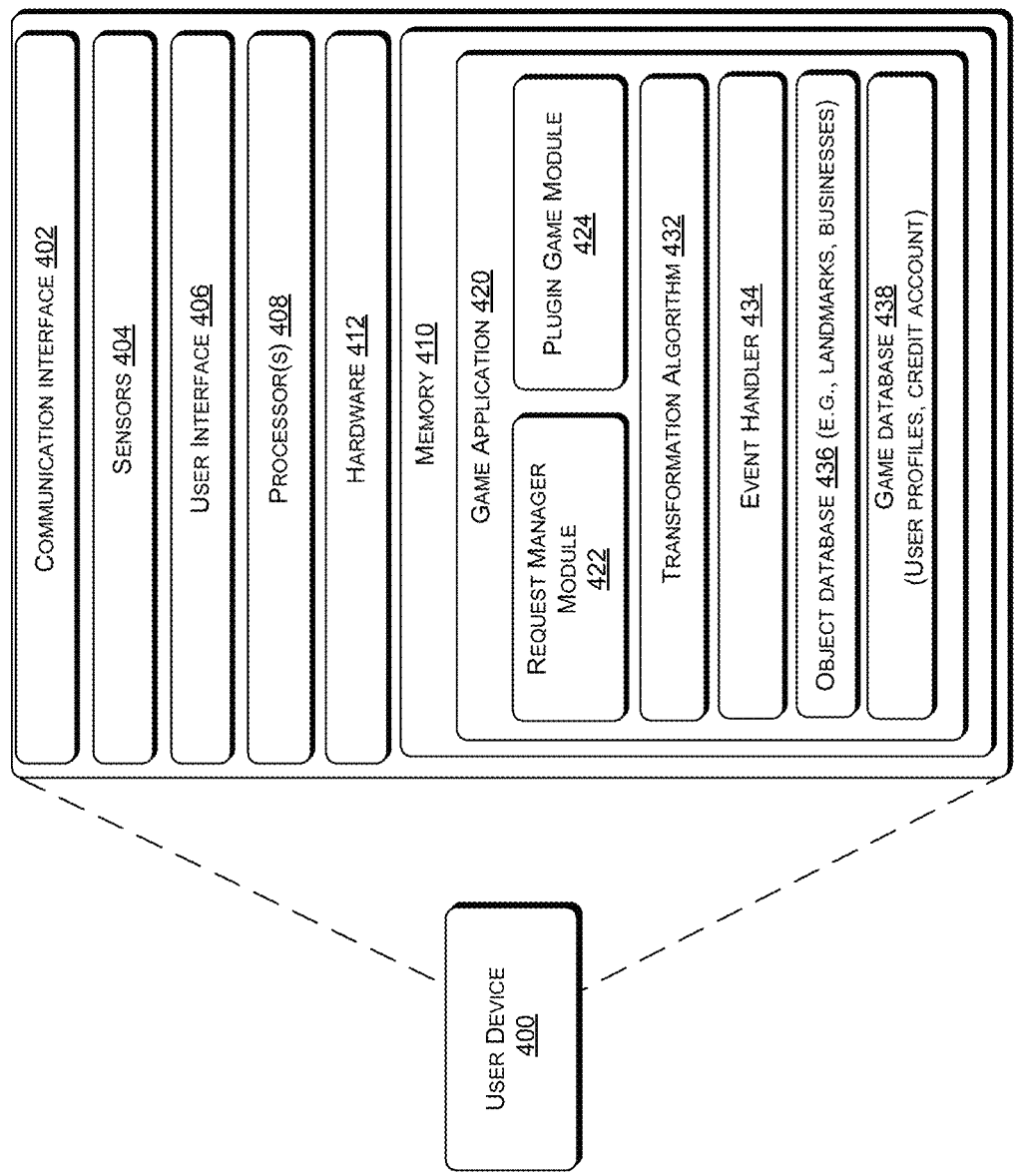
FIG. 4 is an example block diagram of a user device that may host the game application.

FIG. 4 is a block diagram showing various components of a user device 400 that hosts the game application and the installed extension to access the objects in the real-world via the corresponding virtual elements on the geography of the virtual world. The user device 400 may include a communication interface 402, one or more sensors 404, a user interface 406, one or more processors 408, memory 410, and device hardware 412. The communication interface 402 may include wireless and/or wired communication components that enable the user device to transmit or receive voice or data communication via the wireless carrier network, as well as other telecommunication and/or data communication networks. The sensors 404 may include cameras and/or a global positioning system (GPS) sensor, among other appropriate sensors. The cameras may capture images of the environment while the GPS sensor may detect orientation, movement, and geolocation of the user device 400.

The user interface 406 may enable a subscriber to enter inputs and read outputs. The user interface 406 may include a data output device (e.g., visual display, audio speakers), and one or more data input devices. The data input devices may include but are not limited to, combinations of one or more keypads, keyboards, mouse devices, touch screens, microphones, speech recognition packages, and any other suitable devices or other electronic/software selection methods. In one example, the user interface 406 may display the equivalent caricature transformation of the subset map of the real world such as the subset map 210 of FIG. 2. The user interface 406 may further display, for example, the location of the player avatar, mapped locations of the objects via the representative virtual elements, and/or tracked location of the delivery person via the delivery person avatar as described in FIG. 2.

The memory 410 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 412 may include a modem that enables the user device 400 to perform data communication with the wireless carrier network. The device hardware 412 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the user device 400 to execute applications and provide data communication functions.

The one or more processors 408 and the memory 410 may implement an operating system 414, device software 416, and a game application 420. Such software may include routines, program instructions, objects, and/or data structures that are executed by the processors 408 to perform particular tasks or implement particular abstract data types. One or more processors 408 in conjunction with the game application 420 may further operate and utilize a request manager module 422, a plugin game module 424, a transformation algorithm 432, event handler 434, object database 436, and a game database 438. These components of the user device 400 may perform a scaled version of implementing the inter real-world and virtual world subject matter interchange as described above in the network server 302 of FIG. 3. The scaled version, for example, is limited by the processing capability of the user device 400.

The game application 420, when executed, manages the activation or installation of the extension in the user device 400 to enable the player such as the player avatar 228 of FIG. 2 to access the objects in the real-world via the corresponding virtual elements on the virtual world. The game application 420 may be a single block of executable instructions or it may be made up of several components. The components included in at least one implementation are described below. However, it is noted that in other implementations, more or fewer components may be configured and that one or more operations attributed to a particular component in the following description may be implemented in one or more other components.

The request manager module 422 may process transmission to the network server of a request to install or activate the extension such as a plugin to add features to a hosted game application in the user device 400. In one example, the request manager module 422 may send user profile, device information, and/or other information associated with the user device 400 to the network server. In this example, the network server such as the network server 302 of FIG. 3 may verify the requesting user device 400 based upon the received user profile, device information, and/or the like. In some embodiments, the request manager module 422 can perform the functions of the plugin request processor 322 in FIG. 3 as described above.

The plugin game module 424 may be configured to manage the registration of the plugin to implement the inter real-world and virtual world subject matter interchange in the game application. In one example, the plugin game module 424 may verify the compatibility of the configuration of the hosted game application with the plugin to be installed. Following verification of compatibility, the plugin game module 424 may facilitate the installation or activation of the plugin to add more features for the hosted game application. In some embodiments, the plugin game module 424 can also perform the functions of the player interaction analyzer module 324 of FIG. 3 as described above.

The transformation algorithm 432 may correspond to the transformation algorithm 332 of FIG. 3. Given a situation where the user device 400 is hosting the extension to be deployed in another user device, the transformation algorithm 432 may store the algorithms that are used to generate the equivalent caricature transformation of the downloaded subset map of the real-world from the open-source such as ESRI™ open data. For example, the scaling factors of the dilation transformation algorithm as described in FIG. 3 may be used to preserve position transformations of the objects while the angles and/or distances may not be preserved in the process. In this example, the scaling factors may be used on point coordinates to emphasize or deemphasize the objects.

The event handler 434 may include program scripts that can be automatically executed upon a happening of an event. In one example, the player interaction with the virtual elements using the virtual item may generate the event data that can trigger the event handler 434. In this example, the triggering of the event handler 434 may invoke the APIs of the corresponding object that are represented by the virtual element. Similar to the description of the event handler 334 in FIG. 3, the event handler 434 may also comprise one or more invocations of the exposed at least one API to manipulate the objects in the real-world via the representative virtual elements as described herein.

The object database 436 may store the actual locations of the businesses, entities, landmarks, etc. that can be mapped as one or more virtual elements on the geography of the virtual world. The object database 436 corresponds to and performs similar functions to the object database 336 of the network server 302 in FIG. 3.

The game database 438 may store the user profiles, game data for the extension, and/or other information that relates to accessing the object in the real-world via the virtual element in the virtual world. In one example, the plugin game module 24 may associate the user profiles in the game database 438 when requesting installment or activation of the plugin from the network server. The user profiles may include the address for delivery of purchased goods or services, bank account associated with the player avatar for payment of purchased orders, and/or the like.

Example Player Interaction with the Virtual Element

Figure 5:
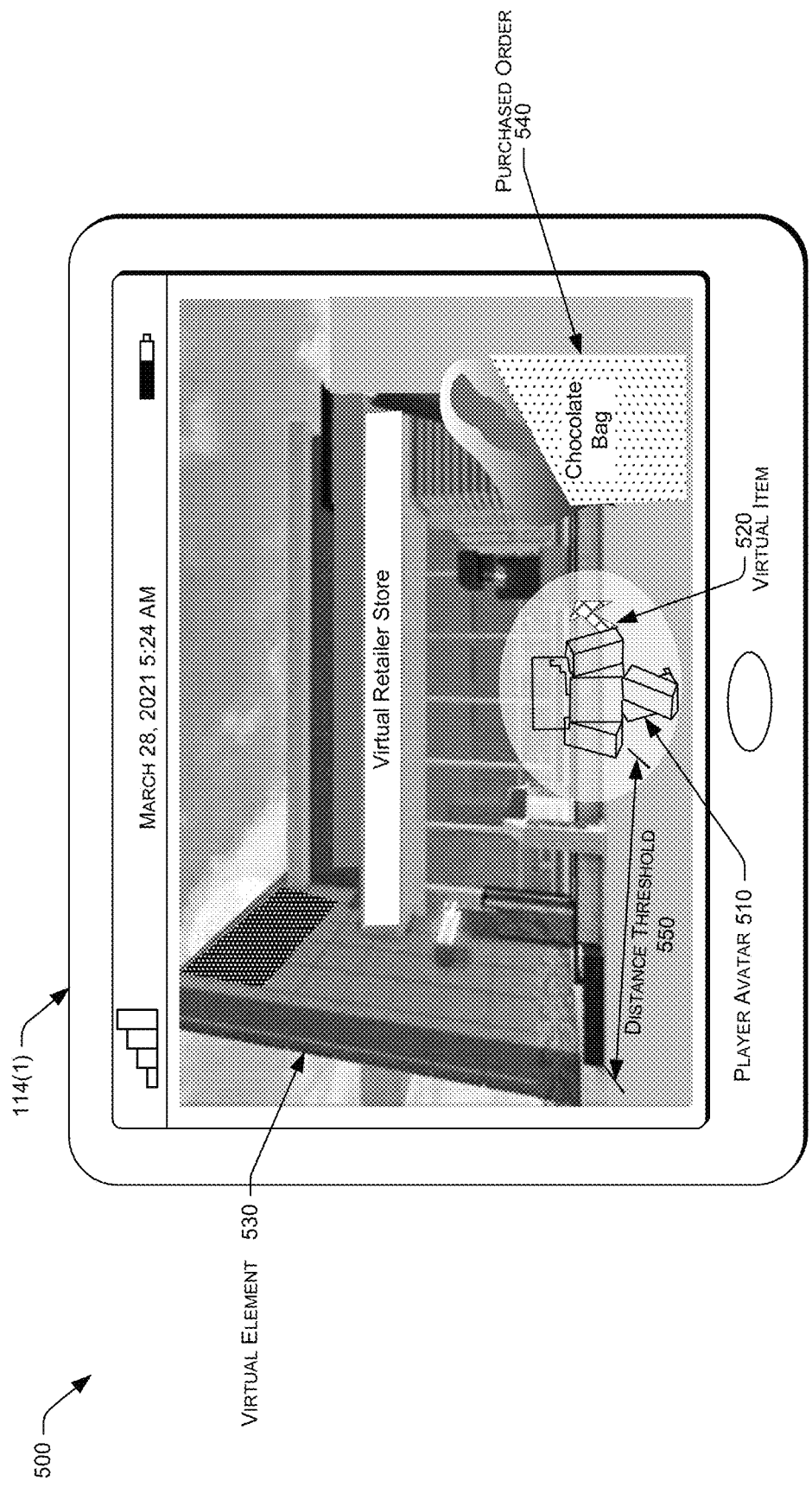
FIG. 5 is an example player interaction that can trigger an event handler and invoke at least one application program interface (API) of a mapped object on the subset map in the real-world.

FIG. 5 illustrates an example player interaction 500 that can trigger the event handler and invoke the APIs of the object on the subset map of the real-world. FIG. 5 shows a player avatar 510 that may be controlled by a user to use a virtual item 520 when interacting with a virtual element 530. The player avatar 510, virtual item 520, and the virtual element 530 correspond to the player avatar 228, virtual item 230, and the virtual element 224, respectively, of FIG. 2. FIG. 5 further shows a purchased order 540 and a distance threshold 550 from a current location of the player avatar 510. The distance threshold 550 may include the limit of an area that may be automatically transformed as the player avatar 510 moves along the geography of the virtual world. The transformation, for example, includes application of a property-preserving function to make the original area or structure isomorphic to the transformed area or structure, respectively.

In an example embodiment, the player avatar 510 may use the virtual item 520 to press a button, wave the virtual item 520 to open an offered menu, rotate the virtual item 520 to order goods or services from the opened menu, lay blocks of regular shapes to create figures of goods or services, and/or perform other interactions that correspond to pre-configured event data. Each of the pre-configured event data may trigger the event handler comprising one or more invocations of the exposed API or APIs. For example, the use of the virtual item to press a particular button in a set of buttons in the virtual element 530 may correspond to a selection of the purchased order 540. In this example, the event handler may be triggered to collect payment of the purchased order 540 from the account of the player avatar 510, send the purchase order to the mapped object in the real world, and track the actual delivery of purchased goods. The event handler may be further triggered to send notifications of the collected payment, tracked location of the delivery person, and/or the like.

In one example embodiment, the caricature transformation of the virtual element 530 may be based upon a current location of the player avatar 510 relative to the virtual element 530. Given a situation where the player avatar 510 is about to enter the virtual element 530 at a front side, the transformation algorithm may emphasize or enlarge a particular area within the distance threshold 550 of the player avatar 510. The distance threshold 550 may include a length measured from the current location of the player avatar 510 to identify the area to be enlarged or transformed. The transformation of this area within the distance threshold 550 of the player avatar 510 may distort the distance and/or angles between the player avatar 510 and the virtual element 530, but this distortion does not change the actual perceivable connections between the player avatar 510 and the virtual element 530.

In one example, a transformation algorithm such as a dilation transformation algorithm may apply a scale factor "$D_k$" to coordinates of the pre-image (not shown) such as the front side of the virtual element 530 that is within 10 meters (distance threshold 550) from the current location of the player avatar 510. In this example, the point coordinates $P1(x_1,y_1)$, $P2(x_2,y_2)$, etc. of the pre-image are transformed to $P1'(x_1,ky_1)$, $P2'(kx_2,ky_2)$, etc. after the application of the scale factor "$D_k$." In this example, still, the transformation may shear other point coordinates outside of the distance threshold 550 to change the distance and/or angles of portions of the pre-image, but the actual perceivable connections between the player avatar 510 and the object are still preserved. Other algorithms for relative position preserving bijective function between the original size to the transformed size can be similarly utilized without affecting the embodiments described herein.

Example Processes

Figure 6:
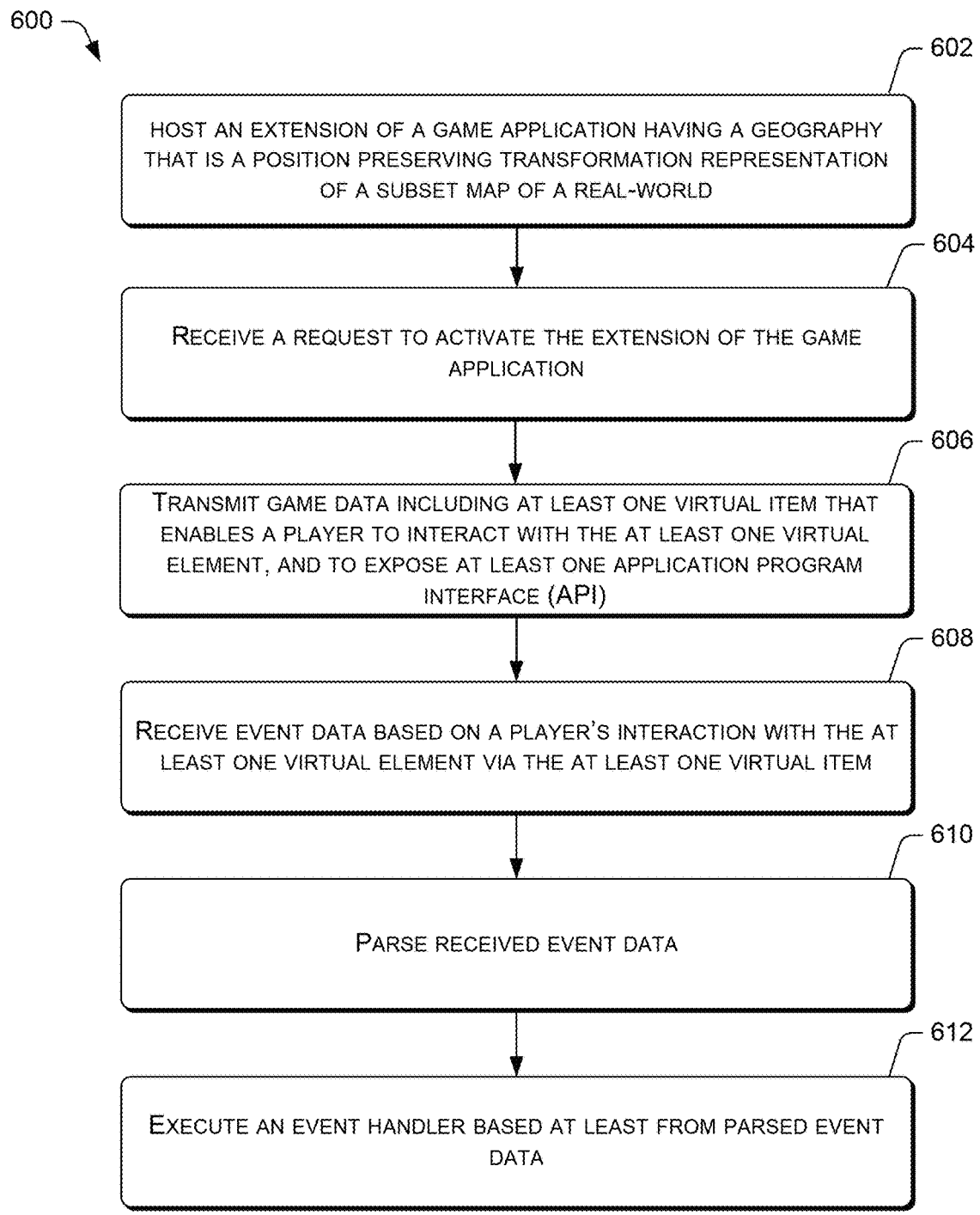
FIG. 6 is a flow diagram of an example methodological implementation for using the extension to transact with mapped objects on the real-world via player's interactions with corresponding virtual elements on the isomorphic virtual world of the game application.
Figure 7:
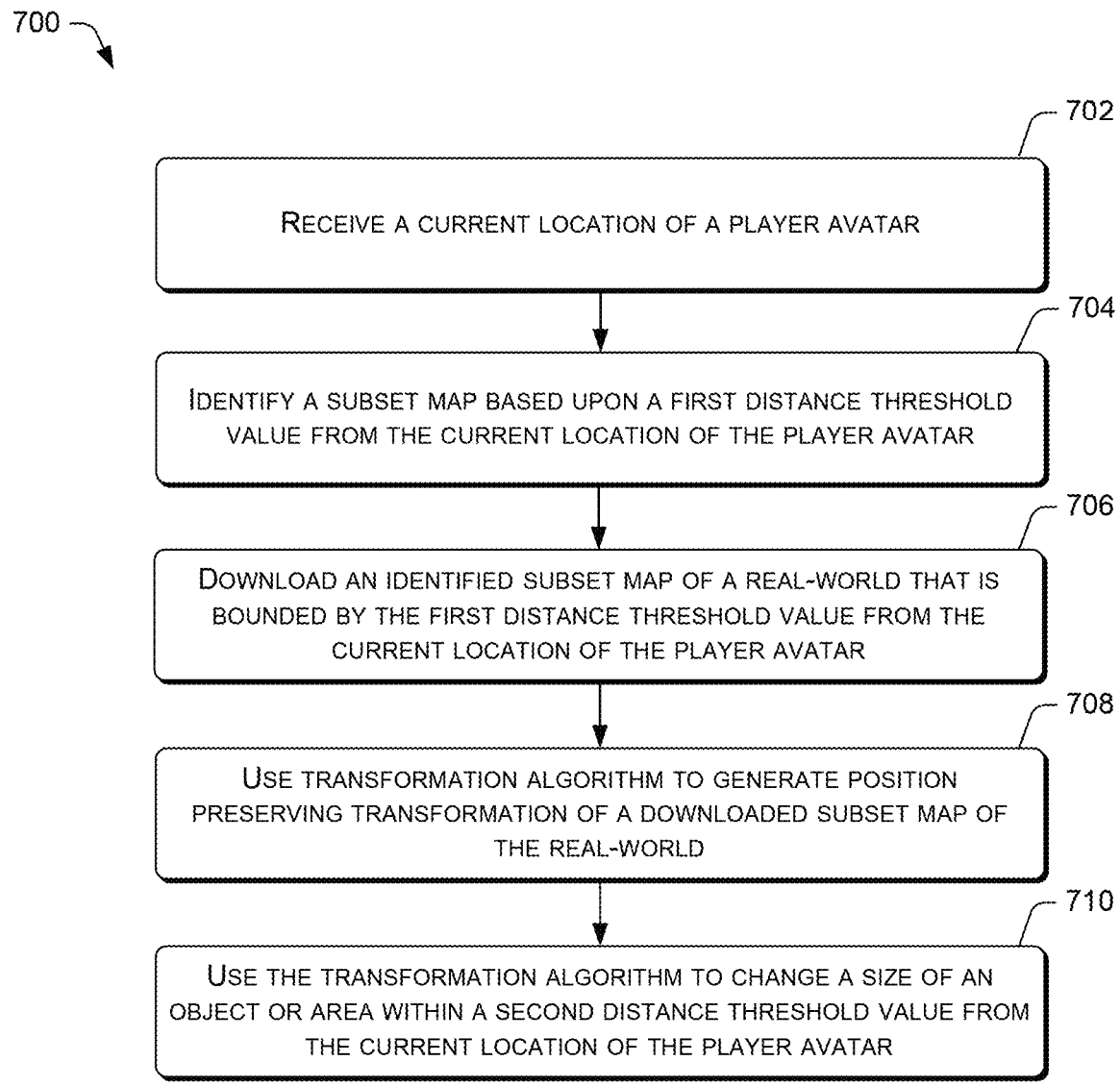
FIG. 7 is a flow diagram of an example methodological implementation for transforming the subset map of the real-world into the isomorphic virtual world.
Figure 8:
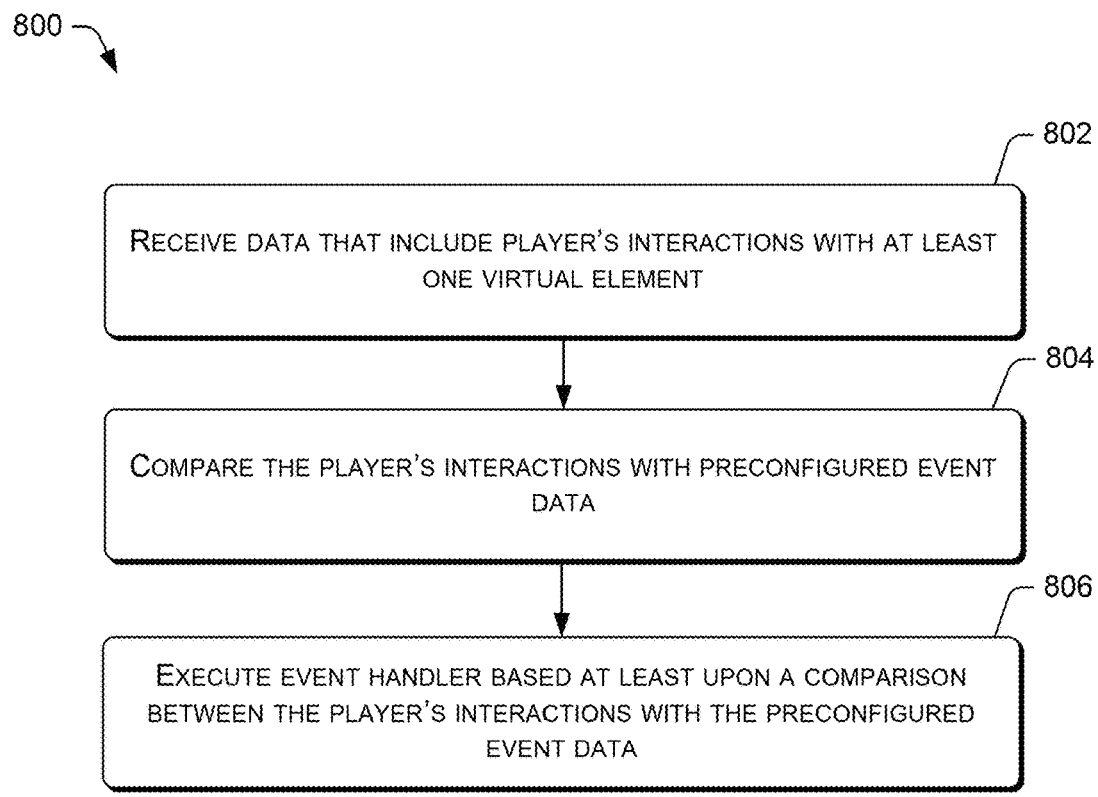
FIG. 8 is a flow diagram of an example methodological implementation for translating the player's interactions with the virtual element to corresponding desired actions on the real-world.

FIGS. 6-8 present illustrative processes 600-800 for implementing the inter real-world and virtual world subject matter interchange via the extension in the game application. The processes 600-800 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-800 are described with reference to FIGS. 1-5.

FIG. 6 is flow diagram of an example process 600 for using the extension to transact with the objects in the real-world via user-controlled player interactions with the corresponding virtual elements on the virtual world. The objects in the real-world may include businesses, entities, and/or purely web-only services.

At block 602, the network server 302 may host an extension of the game application having a geography that is a relative position preserving transformation representation of a subset map of a real-world. In one example, the network server 302 may identify the current location of the player (avatar) based on geolocation coordinates generated by the game application. The network server 302 may then identify a subset map and/or objects in the real-world that are within a distance threshold value (e.g., within 1000 meters) from the current location of the player. In one example, the network server 302 may use a transformation algorithm to generate a relative position-preserving transformation representation of the subset of the real-world. For example, the transformation algorithm utilizes a dilation transformation algorithm that dynamically applies different scale factors to emphasize or deemphasize an object or area. In this example, the dilation transformation algorithm may be an example of bijective property preserving function "f" from "A" to "B" (f: A→B) where "A" is the original scale of the subset of the real-world and "B" is the isomorphic transformation of "A."

At block 604, the network server 302 may receive a request to activate the extension of the game application. In one example, the network server 302 may receive a request from a user device associated with a buyer to install or activate the extension to the game application that is hosted at the user device. The hosted game application may include, for example, Minecraft™, Roblox™ or other game application that includes building and crafting of things using crafting tools.

At block 606, the network server 302 may transmit game data including at least one virtual item that enables the player to interact with at least one virtual element, and to expose at least one API to map a player's interaction with the at least one virtual element (via the at least one virtual item) to a corresponding object in the real-world. The game data may include add-on configurations of the game application following the activation or installation of the extension. For example, the game data may introduce the virtual item that can be utilized by the user-controlled player to interact with the virtual elements. In this example, the game data may also include the execution of event handler based upon the player's interactions with the virtual elements via the virtual item.

At block 608, the network server 302 may receive event data based on a player's interaction with the at least one virtual element via the at least one virtual item. The event data may be generated by the player's interactions with the at least one virtual element. In one example, the game data may include different pre-configured player interactions that are mapped to corresponding event data. The player's interactions may include pressing the virtual item against a button in a selection of buttons in the virtual element, waving the virtual item to retrieve the product menu of the virtual element, rotating clockwise the virtual item to apply a property preserving bijective function to original structure of the virtual element, rotating counter-clockwise the virtual item to deemphasize the virtual element, and so on. Alternatively, the player may also utilize audio-to-text translations of the user that is represented by the player.

At block 610, the network server 302 parses the event data to identify at least one event data that may be used to trigger an event handler. In one example, the parsing of the event data may identify the pre-configured player interactions that may trigger the event handler. The event handler may include a script or program that is associated with pre-configured player interactions. Each of the pre-configured player interactions may be mapped to a corresponding event data that is implemented via the event handler.

At block 612, the network server 302 executes the event handler. In one example, the execution of the event handler may include one or more invocations of the APIs to implement the player's interactions that generated the event data. The invocations may include a collection of payments from the account of the player, ordering of goods from the mapped object, tracking the delivery of the goods to a player's requested location, sending of notifications of delivery, and so on.

FIG. 7 is a flow diagram of an example process 700 for transforming a subset of the real-world into an isomorphic virtual world.

At block 702, the network server 302 receives a current location of a player (avatar). For example, the game application tracks the geolocation coordinates of the player as it moves on a virtual world. The geolocation coordinates may be transmitted to the network server 302 for identification of the current location of the player. Alternatively, the current location of the player avatar can be adjusted based upon the location of a built virtual structure of a virtual element. For example, the player may build from scratch the virtual element that corresponds to a particular retail store in the real-world. The actual location of the particular retail store can be used as the current geolocation of the player.

At block 704, the network server 302 identifies a subset map in the real-world based upon a first distance threshold value from the current location of the player avatar. For example, the first distance threshold value includes a radius of 1000 meters from the current location of the player avatar. In this example, the network server 302 may identify the subset map including the objects that are located within the radius of 1000 meters in the real-world. Alternatively, the subset map in the real-world may be based upon the actual location of the object that corresponds to the built structure of the virtual element. In this case, the first distance threshold value may be based on the actual location of the corresponding object.

At block 706, the network server 302 downloads an identified subset map of the real-world that is bounded by the first distance threshold value from the current location of the player avatar. In one example, the downloaded subset map of the real-world may include the identified objects that are within the first distance threshold value from the current location of the player avatar.

At block 708, the network server 302 uses the transformation algorithm to generate a relative position preserving transformation of a downloaded subset map of the real-world. For example, the downloaded subset map of the real-world includes an area of 10,000 square meters after the application of the first distance threshold value from the current location of the player avatar. In this example, the network server 302 may apply the transformation algorithm that preserves the position transformation of the downloaded subset map. The transformation algorithm, for example, includes an application of the dilation transformation algorithm where a dynamic scaling factor is applied to point coordinates to emphasize or deemphasize the downloaded subset map. This dynamic adjustment in the scaling factor may change the angle and/or distance transformations of the pre-image of the downloaded subset map.

At block 710, the network server 302 uses the transformation algorithm to change the size of the object or area within a second distance threshold value from the current location of the player avatar. In one example, the second distance threshold value such as the distance threshold 550 of FIG. 5 is less than the first distance threshold value for searching the subset map to be downloaded. The second distance threshold value, for example, includes a radius of 10 meters from the current location of the player while the first distance threshold value includes a radius of 1000 meters from the current location of the player avatar. In this example, the network server 302 may change the scale factor of the object or area within the second distance threshold value to further emphasize the object or area. The transformation algorithms as described herein may include a notion of isomorphism where a bijective property preserving function may be applied to change the size of the object or area.

FIG. 8 is a flow diagram of an example process 800 for translating a player's interactions with the virtual element to corresponding desired actions on the real-world.

At block 802, the network server 302 may receive data from a user device including a player's interactions with at least one virtual element. The virtual element may be established based upon the current location of the player where a subset map can be downloaded and transformed to generate the isomorphic virtual world. The objects in the subset map may be represented by virtual elements on the isomorphic virtual world. Alternatively, the virtual element may be established by the building of the virtual structure of the virtual element and the subset map can be based upon the location of the virtual element in the real-world. In this regard, the user's experience in the real world may be leveraged to find things on the isomorphic virtual world. With the established virtual element, the player may interact with the virtual element by using the mechanics of the game application or additional mechanics that may be provided through the activation of the extension. For example, the player may jump outside or inside the virtual element, fly over the virtual element, wave the virtual item alongside the virtual main door of the virtual element, fill out text boxes, enter audio-to-text translations, dig under the virtual element, erase an object or character in front of the virtual element, and so on.

At block 804, the network server 302 may compare the player's interactions with pre-configured event data. Each of the pre-configured event data may correspond to a desired action in the real-world. For example, the virtual player flying over the virtual element may be pre-configured to include ordering of a particular good from the virtual element. In another example, the virtual player waving the virtual item in from of the virtual element opens a main door, and so on. In these examples, the player's interactions are parsed and compared to the pre-configured event data in the database.

At block 806, the network server 302 executes an event handler based at least upon a comparison between the player's interactions and the pre-configured event data.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media storing computer-executable instructions that upon execution cause one or more computers to collectively perform acts comprising:
    hosting, at a server, an extension of a game application having a geography that is a position preserving transformation representation of a subset map of a real-world, wherein objects in the subset map of the real-world are accessed via at least one virtual element on the geography of the extension;
    receiving, at the server, a request to activate the extension of the game application; and
    in response to the request, transmitting game data including at least one virtual item that enables a player in the game application to interact with the at least one virtual element, and to expose at least one application program interface (API) to map a player interaction with the at least one virtual element via the at least one virtual item to a corresponding object in the real-world.

2. The one or more computer-readable storage media of claim 1 further comprising:
    receiving, by the server, a current location of the player;
    identifying the subset map in the real-world based on a distance threshold value from the current location of the player;
    downloading an identified subset map; and
    using a transformation algorithm to generate the position preserving transformation representation of a downloaded subset map.

3. The one or more computer-readable storage media of claim 2,
    wherein the position preserving transformation representation includes preserving connections between pairs of objects in the subset map.

4. The one or more computer-readable storage media of claim 1, wherein the objects are mapped as at least one virtual element on the geography of an isomorphic virtual world.

5. The one or more computer-readable storage media of claim 1 further comprising:
    receiving event data;
    parsing the event data to trigger an event handler comprised of one or more invocations of the exposed at least one API; and
    executing the event handler.

6. The one or more computer-readable storage media of claim 5, wherein the one or more invocations of the exposed at least one API includes a collection of payment from an account of the player.

7. The one or more computer-readable storage media of claim 5, wherein the executing the event handler includes sending a request to a corresponding object in the real-world to perform delivery of purchased goods or services via a player's interaction with the at least one virtual element.

8. The one or more computer-readable storage media of claim 5, wherein the event data is generated from a player's interaction with the at least one virtual element via the at least one virtual item.

9. The one or more computer-readable storage media of claim 1 further comprising: counting a number of purchasing activities performed by the player within a time period;

and rewarding the player with a coupon when a counted number of purchasing activities exceeds a threshold value.

10. A server, comprising:
one or more processors; and
memory including a plurality of computer-executable components that are executable by the one or more processors to perform a plurality of actions, the plurality of actions comprising:
hosting an extension of a game application having a geography that is a position preserving transformation representation of a subset map of a real-world, wherein objects in the subset map of the real-world are accessed via at least one virtual element on the geography of the extension;
receiving event data based on a player interaction with the at least one virtual element, wherein the player interaction exposes an at least one application program interface (API) of an object in the real world that corresponds to the at least one virtual element;
parsing the event data to trigger an event handler comprised of one or more invocations of an exposed at least one API; and
executing the event handler.

11. The server of claim 10, wherein the plurality of actions further comprising:
receiving, by the server, a current location of the player;
identifying the subset map in the real-world based on a distance threshold value from the current location of the player;
downloading an identified subset map; and
using a transformation algorithm to generate the position preserving transformation representation of a downloaded subset map.

12. The server of claim 11, wherein the position preserving transformation representation includes preserving connections or routes between pairs of objects in the subset map.

13. The server of claim 11, wherein the virtual elements correspond to web-only services.

14. The server of claim 10, wherein the objects are mapped as at least one virtual element on the geography of an isomorphic virtual world.

15. The server of claim 10, wherein the one or more invocations of the exposed at least one API includes a collection of payment from an account of the player.

16. The server of claim 10, wherein the one or more invocations of the exposed at least one API includes a delivery of purchased goods or services via a player's interaction with the at least one virtual element.

17. The server of claim 10, wherein the plurality of actions further comprise: counting a number of purchasing activities performed by the player within a time period, and rewarding the player with a coupon when a counted number of purchasing activities exceed a threshold value.

18. A computer-implemented method, comprising:
hosting, at a server, an extension of a game application having a geography that is a position preserving transformation representation of a subset map of a real-world, wherein objects in the subset map of the real-world are accessed via at least one virtual element on the geography of the extension;
receiving, at the server, a request to activate the extension of the game application;
in response to the request, transmitting game data including at least one virtual item that enables a player to interact with the at least one virtual element, and to expose at least one application program interface (API) to map a player interaction with the at least one virtual element via the at least one virtual item to a corresponding object in the real-world;
receiving event data based on the player interaction with the at least one virtual element;
parsing the event data to trigger an event handler comprised of one or more invocations of an exposed at least one API; and
executing the event handler.

19. The computer-implemented method of claim 18 further comprising:
receiving, by the server, a current location of the player;
identifying the subset map in the real-world based on a distance threshold value from the current location of the player;
downloading an identified subset map; and
using a transformation algorithm to generate the position preserving transformation representation of a downloaded subset map.

20. The computer-implemented method of claim 19, wherein the position preserving transformation representation includes preserving connections or routes between pairs of objects in the subset map.

* * * * *